411-21
7/9/85 XR RE 32,242

United States Patent [19]

Minnebraker

[11] E Patent Number: Re. 32,242

[45] Reissued Date of Patent: Sep. 9, 1986

[54] WHEELCHAIR CONSTRUCTION

[75] Inventor: Jeffrey P. Minnebraker, Van Nuys, Calif.

[73] Assignee: Quadra Wheelchairs, Inc., Westlake Village, Calif.

[21] Appl. No.: 653,151

[22] Filed: Sep. 24, 1984

Related U.S. Patent Documents

Reissue of:

[64] Patent No.: 4,351,540
Issued: Sep. 28, 1982
Appl. No.: 206,346
Filed: Nov. 13, 1980

[51] Int. Cl.[4] ..... A61G 5/02

[52] U.S. Cl. ..... 280/242 WC; 297/338; 297/DIG. 4; 403/DIG. 8; 411/21

[58] Field of Search ..... 280/242 WC; 180/907; 297/DIG. 4, 338; 16/31 R, 31 A; 403/DIG. 8; 411/21, 24, 25, 80

[56] References Cited

U.S. PATENT DOCUMENTS

| | | | |
|---|---|---|---|
| 1,784,330 | 12/1930 | Bowers | 301/121 |
| 3,217,478 | 11/1965 | De Geere | 280/47.32 X |
| 3,893,708 | 7/1975 | Moroney | 280/242 WC |
| 3,937,490 | 2/1976 | Mohamed | 280/242 WC |
| 4,098,521 | 7/1978 | Ferguson et al. | 280/242 WC |
| 4,166,631 | 9/1979 | Sanski | 280/242 WC |
| 4,231,670 | 11/1980 | Knoski | 301/121 |

*Primary Examiner*—John A. Pekar
*Attorney, Agent, or Firm*—Robert J. Schaap

[57] ABSTRACT

A wheelchair capable of being constructed in several different sizes from components of standard size in order to permit users of different sizes and users with one or more handicaps to utilize such wheelchairs. The wheelchair includes a main frame and a foot support assembly which can be telescopically adjustably affixed to the main frame. In addition, a seat section can be telescopically adjustably affixed to the main frame such that the seat is located at a selected height and the foot support section can extend outwardly from the frame for a selected distance to accommodate users of differing height. The rear wheels are positionally mounted with respect to the main frame such that the rear wheels can be located in several different positions in order to change the overall center of gravity and the wheelbase of the wheelchair. In this way, the wheelchair can be used for conventional wheelchair movement, as well as for athletic activities. A pair of front wheels are also adjustably positionally mounted with respect to the main frame in order to change the angle of the wheelchair and the seat relative to the ground or other supporting surface.

66 Claims, 11 Drawing Figures

WHEELCHAIR CONSTRUCTION

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates in general to certain new and useful improvements in wheelchairs, and more particularly, to improved wheelchairs which can be constructed in a variety of sizes from standard size components and which also have front and back wheels adjustably mounted thereof.

2. Brief Description of the Prior Art

Wheelchair constructions have remained unchanged, except for relatively minor features, for a substantial period of time. While wheelchairs have existed for many years, they generally were constructed of a main frame, front and rear wheels, side rails or so-called "arm rests" and foot support members. However, there was no means for creating or manufacturing a wheelchair of different sizes, at a relatively low cost, from standard sized components, in order to accommodate different size users.

Prior art wheelchair manufacturers constructed several different sized wheelchairs and used different sized components for each of the differently sized wheelchairs. In the case of a tall individual, the main frame had to be larger, the seat located in a different position, and a foot support member extended further from the seat, than in the case of a wheelchair for a smaller individual. In addition, for the larger sized wheelchair, the seat may have to have been located at a higher elevation in order to permit the user to engage rims on the wheels for propelling the wheelchair in an easy and convenient manner.

Notwithstanding, heretofore there has not been any wheelchair which is designed for anything except normal transport. In other words, wheelchairs heretofore constructed were not designed to permit any form of athletic activity, and particularly, for fast-moving sports activities. This was primarily due to the fact that the prior art wheelchairs were all of a box-like construction with the seat, and hence, the center of gravity, located at a fixed and at a substantial distance above the ground. Consequently, the prior art wheelchairs were not designed for any fast movement, and if one attempted to propel any of the prior art wheelchairs at any significant speed, or attempted to turn a corner quickly, the wheelchair might well tip over creating injury to the user.

In recent years, it has been found to be highly beneficial for paraplegics and others required to use wheelchairs on a relatively permanent basis to engage in various forms of athletic activities, including wheelchair racing, tennis, and the like. However, the wheelchair constructions heretofore did not lend themselves to such form of activities.

For the more seriously handicapped people, particularly with high level back injuries which limited the mobility of these handicapped persons' arms, the conventional wheelchairs are difficult to use. This is due to the heavy construction and weight of the conventional wheelchairs which make it more difficult for the injured party to push and to manuever. As a result, people with such injuries had to resort to the use of motor powered wheelchairs, as for example, electric motor powered wheelchairs which use a battery source of power. These motor powered wheelchairs are quite expensive and require periodic maintenance which thereby militates against widespread use. Further, these wheelchairs require frequent recharging when battery powered.

U.S. Pat. No. 3,937,490 to Nasr discloses a wheelchair having some degree of adjustability to suit several body sizes and deformities. Particularly, the width of the seat and back rest panels may be adjusted, and the length of the seat may be adjusted. However, this patent does not disclose a wheelchair which can be made from a common main frame and in a variety of commonly sized components which are capable of being mounted in a desired location in the same manner as taught and claimed in the instant application. U.S. Pat. No. 4,046,374 to Breyley discloses a walking aid which includes caster wheels. In addition, the walking aid is provided with telescopically located adjustable members.

OBJECTS OF THE INVENTION

It is, therefore, a primary object of the present invention to provide a wheelchair which may be constructed of a main frame and a plurality of commonly sized auxiliary components adjustably attached to the main frame in order to suit different sized users.

It is another object of the present invention to provide a wheelchair of the type stated in which a seat section can be adjustably attached to the main frame in a variety of positions and a foot support member can be adjustably attached to the main frame in a number of positions, and with at least front or rear wheels capable of being adjustably attached to the main frame in a variety of positions.

It is a further object of the present invention to provide a wheelchair of the type stated having rear wheels which are capable of being shifted longitudinally and vertically in order to change the wheel base of the wheelchair and vertically in order to change the angle of attack of the wheelchair.

It is an additional object of the present invention to provide a wheelchair of the type stated in which the front wheels can be adjustably positioned, and in which a front wheel mounting means is capable of receiving different sized front wheels.

It is still another object of the present invention to provide a wheelchair construction of the type stated which is uniquely adapted for normal use and also for athletic activities, by mere adjustment of the positions of the wheels.

It is still another object of the present invention to provide a method of manufacturing a wheelchair from a limited number of common components such that the wheelchairs can be of differing sizes in order to suit different sized users.

It is still a further object of the present invention to provide a method of changing the wheel base and also changing the center of gravity of a wheelchair in order to permit the same to be used in normal transport activities and also for athletic activities.

With the above and other objects in view, my invention resides in the novel features of form, construction, arrangement and combination of parts presently described and pointed out in the claims.

SUMMARY OF THE DISCLOSURE

A wheelchair comprising a main frame, a seat structure, and a foot support structure with the latter two components capable of being adjustably positioned on the main frame. In this way, a wheelchair constructed from commonly sized components can be made in a number of different sizes in order to suit differing sized users and users with different forms of disabilities or deformities.

The main frame generally comprises a plurality of longitudinally extending rigid members which are connected by a plurality of transversely extending rigid members. A plurality of first upright members are located on a rear portion of said frame, and a plurality of second upright members are located on the front portion of said main frame. The seat structure is capable of being attached to and adjustably positioned on the main frame, as aforesaid. The seat structure is comprised of a seat frame having a plurality of first posts capable of being fitted with respect to a separate one of the first upright members and adjustably located thereon. A seat pad is also carried by this frame.

One of the other main components forming part of the wheelchair is the foot support structure which is also capable of being attached to and adjustably positioned at a front portion of the main frame. The foot support structure is comprised of a plurality of second posts with each capable of being fitted with respect to a separate one of the second upright members. A foot receiving member is also carried by these second posts. In this way, several different sized wheelchairs can be constructed with commonly sized main frames and foot support structures and seat structures.

The seat frame preferably has additional posts capable of being fitted with respect to upper ends of the first upright tubular members as well. In another embodiment of the invention, the upright members and the posts are capable of being fitted with respect to one another and adjustably telescopically arranged. More specifically, the upright members are tubular, and the posts are capable of being fitted within the open ends of the upright members.

In another embodiment of the invention, arm rests or side frames are capable of being adjustably attached to the main frame. In like manner, rear wheels are capable of being mounted with respect to the main frame in a plurality of positions, and front wheels are also capable of being mounted with respect to the main frame in a plurality of positions.

The present invention also provides an apparatus for selectively positioning the rear wheels of a wheelchair to selectively alter the center of gravity thereof. This apparatus comprises a pair of spaced apart plates which are mounted on the main frame. A plurality of axle receiving locations are provided on each of the spaced apart plates and are capable of receiving a rear wheel axle in each of such locations. A rear wheel axle is provided and is capable of extending in the rear wheel axle locations on each of said plates. Further, a quick release means is associated with the rear wheel axles to enable quick release and replacement of rear wheels on these rear wheel axles. Thus, the rear wheel axles can be easily removed from one location and replaced in another axle receiving location so that the response and center of gravity and the wheel base on said frame can be easily and quickly altered. In more detail, the axle receiving locations comprises a plurality of pairs of spaced apart openings in each of the spaced plates to receive the rear wheel axles. These plates are located on opposite sides of the main frame. Further, a retaining member may be associated with each of the plates. Each retaining member is also provided with a plurality of openings which are aligned with the openings on the plates with which the retaining members are associated.

In another embodiment of the invention, the quick release means are preferably located on each rear wheel axle. The quick release means may comprise at least one retaining pin extending outwardly from the axle and capable of being retracted therein to permit removal of the wheel on the axle. A manually actuable means, such as a shiftable rod on each shaft, causes said retaining pin to be retracted upon actuation thereof.

As indicated previously, the front wheels on each of the wheelchairs can also be adjustably positioned. Particularly, the front wheels can be selectively positioned to alter the angle of attack of the wheelchair relative to a ground plane. As used herein, the term "ground plane" refers to a ground surface of other supporting surface upon which the wheelchair could be used and is generally a horizontal plane. Further, the position of the front wheels can be altered relative to the rear wheels in order to change the wheel base. Thus, for example, the rear wheels can be shifted closer to or further from the front wheels and/or the front wheels can be shifted closer to or further from the rear wheels. In addition to the above, the front wheels and the rear wheels can be shifted simultaneously in the same direction to affect the positions of the front and rear wheels relative to the main frame in order to vary the riding characteristics of the wheelchair.

The apparatus for selectively positioning the front wheels comprises a pair of wheel post housings on the main frame means. A post extends outwardly from each of these wheel post housings. A separate bracket is carried by each of the posts and is rotatable about a generally verticle axis relative to the associated wheel post housing. Each of the brackets has a pair of spaced apart plates with a plurality of aligned apertures in said spaced apart plates. A separate wheel assembly is also provided for each bracket, and each wheel assembly is comprised of a wheel and a front wheel axle capable of being disposed in any of the plurality of aligned apertures. In this way, it is possible to adjust the plane of the frame, and hence, the angle of attack of the wheelchair relative to the ground plane.

In another embodiment of the invention, these front wheel brackets are sized so that different sized wheels can be removably mounted with respect to the brackets. Further, the wheel posts are generally vertically located, and said posts extend downwardly and outwardly from the associated wheel post housing.

The rear wheels are normally adapted for engagement with the ground or other supporting surface and are capable of being operatively engaged by a user for propelling the wheelchair. In like manner, the front wheels are normally adapted for engagement with the ground or other supporting surface. The front wheels typically have a diametral size which is substantially less than the rear wheels. In one embodiment of the invention, a foot rest member of foot support member may be provided on the frame means and extend forwardly therefrom as aforesaid. A pair of rollers may be provided on the foot rest member and are normally spaced above the ground or other supporting surface when the wheelchair is used for normal transport. However, these rollers enable the wheelchair to be tipped forwardly by the user thereof so that the rear wheels are temporarily raised from the ground or other supporting surface, and the rollers are thereupon lowered into engagement with the ground or other supporting surface. This may be a temporary condition which may exist in athletic activities or the like. Moreover, in the event that the user of the wheelchair becomes overzealous and attempts to tip the wheelchair, as for example, in an athletic activity, the rollers will prevent the entire wheelchair from tipping over.

In still a further embodiment of the invention, it is also possible to provide an outwardly extending frame on the rear portion of the wheelchair, if desired. This latter frame may also be provided with rollers on the lower portion thereof. Thus, these rollers on the rearwardly extending frame would also engage the ground or other supporting surface when the front wheels were temporarily tipped above the ground or other supporting surface.

The rollers which are typically used on a wheelchair, as aforesaid, have a diametral size which is substantially less than the front wheels. Further, the front wheels and rollers are mounted so that they are capable of rotation in the same direction as the rear wheels and are also capable of rotation about a vertical axis. The rollers in this case may adopt the form of casters.

It is also possible to cant (often referred to as "camber") the rear wheels so that the lower portions are disposed outwardly with respect to the main frame, and the upper portions are disposed inwardly toward the frame. This type of canting or cambering of the rear wheels also provides increased stability, particularly when the wheelchair is used in athletic activities. In addition to the canbering, the wheels can be toed in or out, as may be decreed.

This invention possesses many other advantages and has other purposes which may be made more clearly apparent from consideration of the forms in which it may be embodied. These forms are shown in the drawings forming and accompanying part of the present specification. They will now be described in detail for the purposes of illustrating the general principles of the invention, but it is to be understood that such detailed descriptions are not to be taken in a limiting sense.

BRIEF DESCRIPTION OF THE DRAWINGS

Having this described the invention in general terms, reference will now be made to the accompanying drawings (four sheets) in which.

DETAILED DESCRIPTION OF PREFERRED EMBODIMENTS

Figures 1, 4:
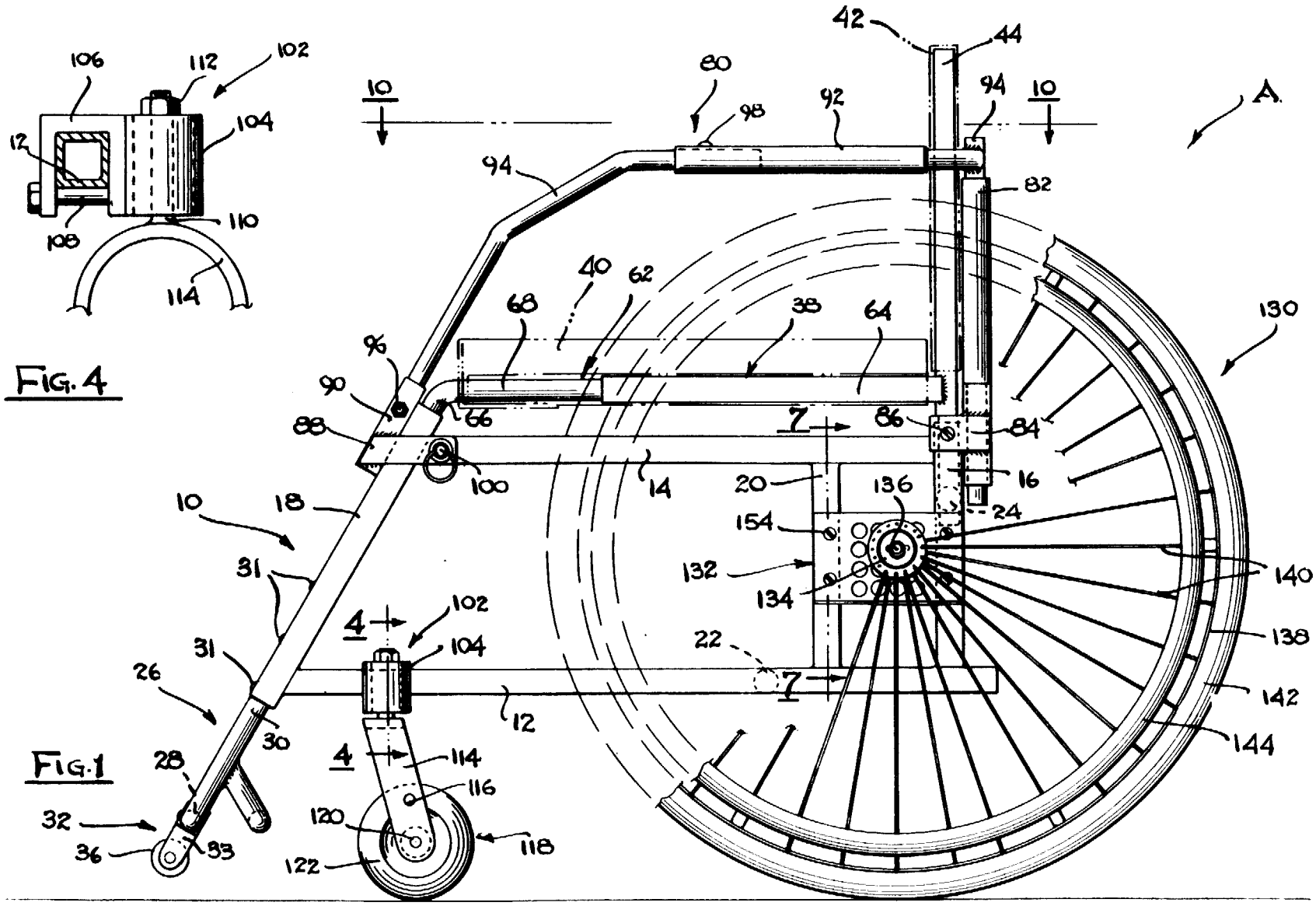
FIG. 1 is a side elevational view of a wheelchair constructed in accordance with and embodying the present invention.
FIG. 4 is a fragmentary vertical sectional view taken along line 4—4 of FIG. 1.

Referring now in more detail and by reference characters to the drawings which illustrate practical embodiments of the present invention, A designates a wheelchair having a main frame 10. The main frame 10 is more fully illustrated in FIGS. 1 and 2 and comprises a pair of longitudinally extending lower bars 12 and a pair of upwardly spaced longitudinally extending upper bars 14. At the rearward end, the upper and lower bars 14 and 12 are connected by a pair of transversely spaced apart vertically extending bars or rigid members 16. At their forward ends, the upper and lower sets of bars 12 and 14 are connected by somewhat upright rigid members or bars 18, in the manner as more fully illustrated in FIGS. 1 and 2. In like manner, intermediate the rear upright rigid members or bars 16 and the front bars 18 are a pair of intermediate upright bars 20 which connect each of the opposite sides of the upper and lower bars 12 and 14.

The intermediate bars 20 are spaced somewhat closer to the rear upright bars 16. In this respect, the front bars 18 are referred to as being upright, even though they are not truly vertically disposed, inasmuch as they do have a vertical component and do extend between the lower and upper bars 12 and 14.

Extending between the lower bars 12 is a transversely extending connecting bar 22. In like manner, extending between the rear upright bars 16 is a transversely connecting bar 24.

Each of the aforesaid bars are essentially welded with respect to one another in order to form the overall main frame 10, in the manner as illustrated. Thus, these main bars may be formed of various metals, such as steel, stainless steel, aluminum, or the like. In one of the more preferred embodiments of the invention, each of the components of the main frame is preferably formed for aluminum or titanium in order to provide the light weight to the wheelchair, and also to provide the necessary rigidity. In addition, the use of these metals also permits the wheelchairs to withstand a substantial amount of physical abuse, as for example, the kind encountered in sports activities.

Each of the aforesaid bars is also rectangular in construction and tubular. However, if desired, the bars could be formed of a solid metal. Moreover, the rectangular shape has been found to be not only aesthetically desirable, but highly effective to provide the necessary degree of ridigity.

This main frame 10 can be used in order to construct a variety of different sized wheelchairs by merely adjustably positioning the seat structure and the foot support structure as hereinafter described in more detail. Moreover, this same main frame may be used in the construction of wheelchairs which function for normal transport and which can also be used in athletic activities. Otherwise, the same main frame can be used in the manufacture of a wheelchair primarily designed for athletic activities or otherwise, a wheelchair normally and primarily designed for normal transport.

Figure 2:
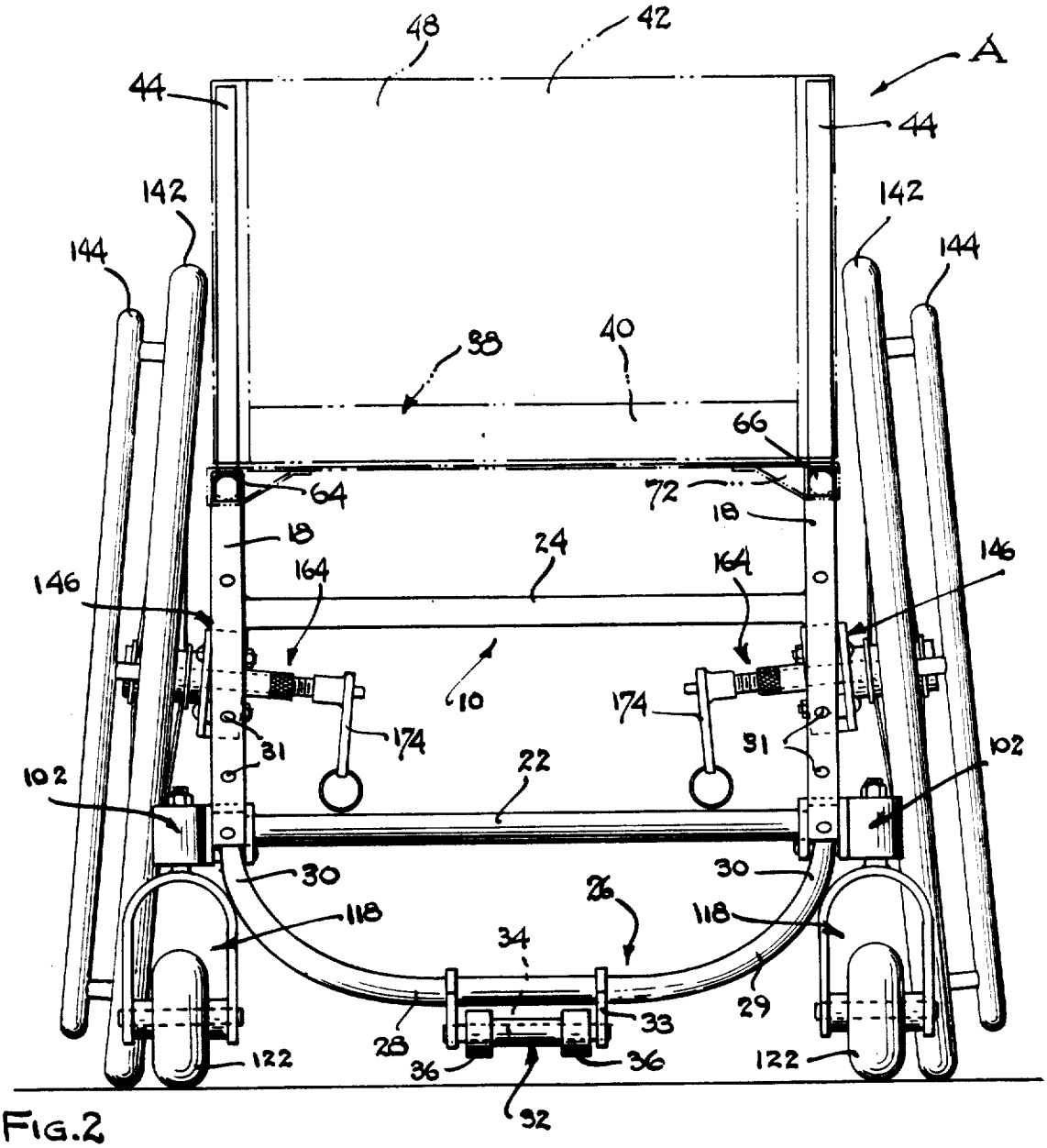
FIG. 2 is a front elevational view of the wheelchair of FIG. 1.

Provided for attachment to the lower ends of the front uprights 18 is a foot support structure 26, and which foot support structure is more fully illustrated in FIGS. 1 and 2 of the drawings. The foot support structure 26 is comprised of a generally horizontally disposed foot support member 28 which integrally merges through arcuately shaped bends 29 into a pair of upright posts 30. By further reference to FIG. 2, it can be observed that the posts 30 are aligned with the open lower ends of the uprights 18. Moreover, the posts 30 are capable of extending into the tubular uprights 18 so as to adjust the overall distance between the main frame 10 and the horizontal foot support member 28. In addition, the posts are secured within the tubular uprights 18 in the desired positions by means of set screws or similar forms of fasteners 31. It can be observed, that by adjusting the position of the posts 30 within the lower ends of the uprights 18, that it is possible to adjust the overall distance of the foot support member 28 to a seat (hereinafter described) and also to adjust the overall effective horizontal distance of the foot support member from the main frame.

The foot support member is also preferably formed of light weight metals, such as aluminum, or the like. Moreover, for ease of construction, simplicity, and low cost, the foot support member 26 can be formed almost as an integral structure with the tubular member being bent for insertion into the posts.

Mounted on foot support member 28 is a front roller assembly 32, and which is comprised of a bracket 33 rigidly mounted on the horizontal rod 28. Carried by the bracket is a pin 34 which, turn, carries a pair of rollers 36. By reference to FIGS. 1 and 2, it can be observed that the rollers 36 are raised above the ground or other supporting surface when the rear wheels and the front wheels are located in contact with the ground or other supporting surface. However, it can be observed that during any activity if the rear wheels should be temporarily elevated from the ground in an attempt to tip the chair by the user, the front rollers 36 will contact the ground to prevent the chair from tipping over. Again, means could be provided for adjusting the relative height of the rollers 36 such that they could provide the desired amount of clearance, and yet also prevent an inadvertent complete tipping over the wheelchair, which could result in injury to the user.

It should be understood that a similar frame could be mounted on a rear portion of the main frame 10 so as to mount rear rollers similar to the front roller assembly 32. In this way, if the wheelchair were tipped rearwardly, such rear rollers would also prevent the wheelchair from tipping over in the rearward direction.

The illustrated and described wheelchair A also comprises a seat structure 38 which is more fully illustrated in FIGS. 1 2, 10 and 11. The seat structure 38 generally comprises a buttocks and leg supporting seat section 40 and a back supporting section 42. The back supporting section 42 generally comprises a pair of tubular posts 44 which are generally circular in shape and are adapted to extend into the opened upper ends of the rear uprights 16. Tubular posts 44 also extend into pockets 46 formed along the opposite transverse ends of a backrest pad 48. Moreover, the pockets 46 merge into shoulders 50 at their lower ends. Mounted on the posts 44 are collars 52 which are adjustably positioned thereon by means of set screws 54. In this way, the collars 52 will control the distance that the posts 44 extend into the pockets 46. Moreover, the collars 42 can abut the upper ends of the uprights 16 when the back support 42 shifted to its lowermost position. Thus, the collars 52 also provide a means to adjust the overall height of the back support pad 48.

The back support pad 48 may also be provided with a securement strap 56 which is adapted to extend around crossbar 24. Further, the securement strap 56 would be provided with an attachment means 60 which, in this case, adopts the form of a Velcro releasably attachable strip.

The back support pad 48 is preferably comprised of an outer cover, such as a cloth material, and an inner pad (not shown), and which is formed of a resilient material such as styrofoam or polyurethane foam. In this way, the outer cover of the back seat support 48 could be changed if desired.

The frame also includes a horizontal frame section 62 or so-called seat support section comprised of a pair of horizontally disposed longitudinally extending and transversely spaced apart rods 64 which are secured at their rearward ends to the uprights 16 thereby forming a single seat frame. At their forward ends, the rods 64 integrally merge into generally downwardly struck posts 66 which are adapted to extend into the opened upper ends of each of the front forward uprights 18, in the manner as best seen in FIGS. 1 and 2 of the drawings. Moreover, while not absolutely necessary, in some cases, it may be desirable to secure the posts 66 in their telescoped position within the uprights 18 by means of suitable fasteners, such as set screws, or the like.

The longitudinally extending rods 64 also telescopically merge into forward extending frame members 68 located parallel to the above mentioned frame members 14, as more fully illustrated in FIGS. 1, 2, 10 and 11. The supporting seat section 40 is provided with an outer cover 70 which is provided with sewn pockets 72 in order to receive the rods 68 along with the longitudinally extending rods 64. The pockets 72 are designed so that the rods can be removed therefrom in order to permit the mounting of a new outer cover 70. Suitably enclosed within the cover 70 is a pad 74 similar to the pad used in the back section 48. Thus, this pad can be formed of a foam type material, such as a urethane foam, or the like. The cover 70 is provided with a front opening and a releasable flap 76 in order to permit access to the pad 74. Moreover, the flap 76 is securable to the underside of the cover 70 by means of a suitable securement means, such as a Velcro attachment, or the like.

This construction is highly effective in that it enables the pad 74 to be easily interchangeable. In many cases, the users of wheelchairs are incontinent or otherwise have difficulty controlling body discharge, such as urine. As a result, the pad 74, and for that matter, the seat cover 70 may become soiled and require replacement. This construction enables very easy removal of one soiled pad and insertion of a new seat pad 74. In like manner, this construction also enables easy and convenient exchange of one supporting seat structure for another.

The wheelchair can be provided with an arm rest structure 80 or so-called side rail structure or arm support structure. One embodiment of the arm rest structure which may be used in the illustrated and described wheelchair is more fully illustrated in FIG. 1 of the drawings. The arm rest or side rail structure 80 is generally comprised of a pair of vertically disposed tubular retainer sleeves 82 which are mounted on the rear portion of the wheelchair as more fully illustrated in FIG. 1.

The supporting sleeves 82 are provided at their lower ends with forwardly struck brackets 84 for securement to the frame of the wheelchair by means of conventional fasteners, as for example, by screws 86. In this way, the tubular supporting sleeves 82 may be removably mounted on the wheelchair when it is desired to use an arm supporting structure 80.

Secured to the forward ends of each of the opposite horizontally disposed rods 14 are plates 88 which carry at their forward ends, upwardly disposed tubular sleeves 90. In like manner, the tubular sleeves 92 also cooperate with the sleeves 90 and are located to receive rods 44, which are, in turn, removably disposed within the sleeves 82. The sleeves 92 are horizontally disposed, and the sleeves 90 and 92 in the respective pairs, removably attach rods 94 by means of set screws 96 and rivets 98, respectively. In this way, the rod 94 along with cooperating sleeves 90 and 92 and the sleeve 82 each form a side rail on opposite sides of the wheelchair A.

The arm supporting structures 80 are also shiftable out of the way in order to permit entry into and removal of a person from a wheelchair. For this purpose, the plate 88 may be removably secured to longitudinally extending bars 14 by removable locking pins 100. These locking pins 100 are conventional in their construction. Typically, they are provided with a manually actuable member, such as a push-button, in order to permit release of the locking pin. Thus, when the locking pin 100 has been removed, the plate 88 is disengaged from the rod 14 thereby permitting the entire arm portion, including the sleeves 90 and 92 and the rod 94, to be shifted in a lateral direction about a vertical axis extending through the sleeve 82. In like manner, the arm supporting structures can be returned to their position on the sides of the wheelchair by merely locking the plates 88 into the bars 14 with the locking pins 100.

Figure 3:
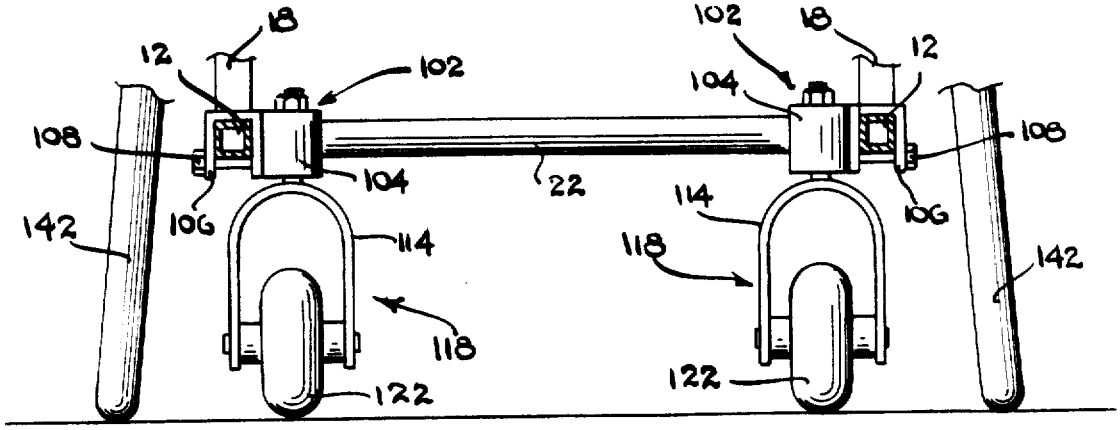
FIG. 3 is a fragmentary front elevational view showing the front wheels of the wheelchair in an alternate position.

On the forward ends of the wheelchair A, on each of the opposite sides thereof, are front wheel assemblies 102 and which are more fully illustrated in FIGS. 1-3 of the drawings. Each front wheel assembly 102 generally comprises a mounting hub 104 which is rigidly secured to an inverted U-shaped bracket 106 as best seen in FIG. 4. In this case, the bracket 106 is adapted to be disposed over either of the longitudinally extending bars 12. Moreover, the mounting hub 104 may be secured in a selected position along the longitudinal bar 12 by means of a bolt 108 which extends through the bracket 106 and into the mounting hub 104. Disposed within and extending downwardly from the mounting hub 104 is a rod 110 which is secured within the hub 104 by means of a nut 112 at a threaded upper end of the rod 110. The rod 110 is, in turn, secured at its lower end to a wheel supporting bracket 114 which is generally of an inverted U-shape, as also best seen in FIGS. 2-4 of the drawings. The wheel mounting bracket 114 is provided with a first pair of lower axle receiving apertures and an upwardly located second pair of axle receiving apertures 116. In this case, each of the apertures in the respective pairs are located on opposite sides of the wheel mounting bracket 114. A wheel assembly 118 is comprised of a wheel axle 120 and a front wheel 122 is mounted in one of the pairs of apertures in the lower pairs of apertures 116, as shown on each of the brackets.

The second pair of apertures 116 which are located upwardly from the lower pair are adapted to receive axles and wheels of larger diameter. In this way, the front wheels can either be mounted in the upper apertures such that a forward tilt is provided to the wheelchair, otherwise, larger wheels could be so mounted. It should be understood that additional pairs of apertures could be provided in each of the wheel mounting brackets 114 as may be desired in order to further adjustably position the wheels, or to otherwise, provide for different diameter wheels.

By means of the above construction, it can be observed that the front wheels can be shifted closer to or further from the rear wheels in order to change the overall wheel base of the wheelchair. Further, the shifting of the front wheels relative to the rear wheels may also affect the angle of attack of the wheelchair as hereinafter described in more detail. Thus, for example, if the rear wheels are changed in vertical position, the position of the front wheels relative to the rear wheels will affect the angle of attack.

By further reference to FIGS. 2 and 3 of the drawings, it can be observed that the front wheels can be reversed so as to be located either inwardly or outwardly of the main frame 10. FIG. 2 illustrates the front wheels or so-called "casters" mounted exteriorly on the opposite longitudinal sides of the frame 10. By merely loosening the bolt 108 and removing the bracket 106, it is possible to rotate each of the front wheel assemblies and mount them on the interior of the lower rails 12 as illustrated in FIG. 3 of the drawings. This latter arrangement is preferred when the wheelchair is to be used in athletic activities in order to provide greater clearance, as for example, in bouncing a basketball moving a tennis racket, or the like. In this way, the front wheels will not interfere with any moving object or a moving arm of the user of the wheelchair.

The wheelchair A of the present invention is also provided with a pair of rear wheels 130 and which are retained on the wheelchair on the main frame 10 by means of rear wheel mounting assemblies 132 which are more fully illustrated in FIGS. 1 and 5-7 of the drawings. In this case, the rear wheels each comprise a center hub 134 which is capable of receiving a rear wheel axle 136 as hereinafter described in more detail. The center hub is connected to a relatively rigid rim 138 by means of a plurality of spokes 140. Suitably mounted on the rim 138 is a tire, which is preferably a rubber tire 142. In a conventional manner, it is preferable to have the tire 142 removably mounted for purposes of replacement. Also suitably mounted on each of the wheels 130 is a hand engagable circumferentially extending rim 144 which is adapted to be engaged by the hands of the user for causing roation of the wheels about their central axis and thereby causing propelling movement of the wheelchair.

Figure 5:
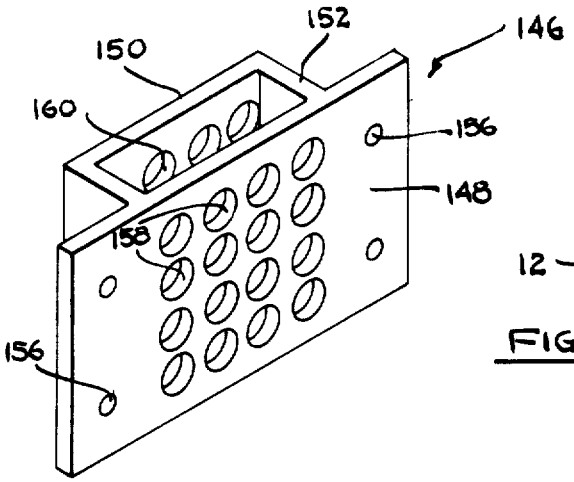
FIG. 5 is a perspective view of a rear wheel mounting bracket forming part of the wheelchair of the present invention.
Figure 6:
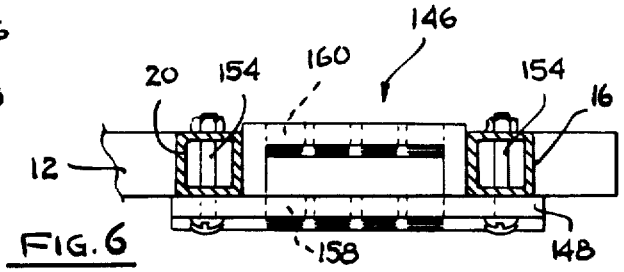
FIG. 6 is a top plan view, partially broken away and in section, and showing the means for attaching the mounting bracket of FIG. 5 to the main frame of the wheelchair.

The rear wheel mounting means 132 preferably comprises a mounting bracket 146 which is, in turn, mounted to the main frame 10 of the wheelchair. Each of the brackets 146 are mounted to the upstanding bar 16 and the intermediate upstanding bar 20 in the manner as illustrated in FIG. 1 of the drawings. Each of the brackets 146 are provided with a face plate 148 and a spaced-apart mating plate 150 connected to the plate 148 by means of a pair of rearwardly extending arms 152. Moreover, the plate 148 is secured to the upstanding bars 16 and 20 by means of sheet metal screws, bolts or similar fasteners 154. For this purpose, the plate 148 is provided with a plurality of bolt receiving apertures 156 in the manner as illustrated in FIG. 5 of the drawings. Further, it can be observed that the inwardly located mating plate 150 has a smaller size than the plate 148 so as to be snugly disposed between the two upstanding bars 16 and 20.

Each of the plates 148 and 150 are provided with a plurality of aligned apertures 158 for receiving a rear wheel axle 136. These apertures 158 and 160 define rear wheel axle receiving locations such that the rear wheel axles 136 can be located in any of the sets of apertures 158 and 160.

Figure 7:
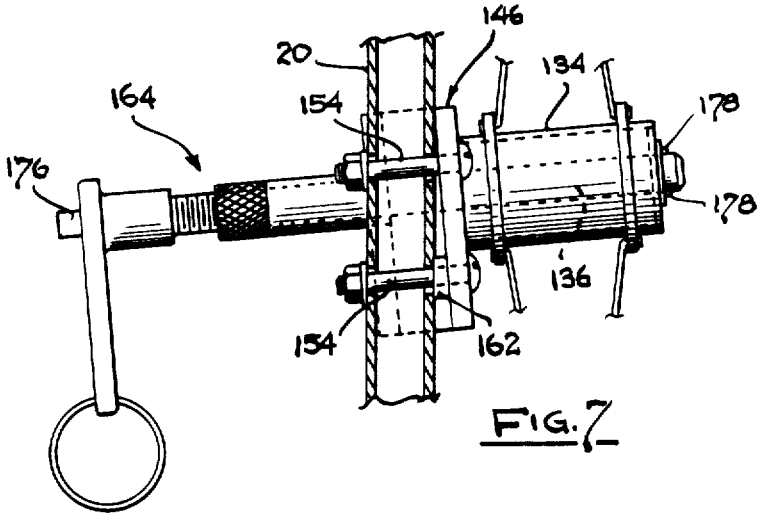
FIG. 7 is a side elevational view, partially broken away and in section, and showing a quick release means for removably locking a rear wheel to the wheelchair and taken along line 7—7 of FIG. 1.

By reference to FIG. 7 of the drawings, it can be observed that the mounting bracket 146 is not mounted in a truly vertical position. Rather, the bracket 146 is canted somewhat such that the rear wheel axle 136 is also located at an angular relationship with respect to a true horizontal. In this way, the rear wheels 130 are canted somewhat in the manner as illustrated in FIG. 2 of the drawings and as hereinafter described in more detail. The mounting brackets 146 may be mounted to the main frame by using one or more shims 162 in the manner as illustrated in FIG. 7. In this way, the mounting bracket 146 is angulated away from the true vertical position, and hence, the axle 136 is located so that the rear wheels are canted with the upper ends of the wheels being located inwardly and the lower ends of the wheels being struck outwardly. It has been found in connection with the present invention that it is desirable to actually cant the wheels in this fashion in order to provide greater stability to the wheelchair, particularly when the latter is used in sports activities such as racing events, and the like. The rear wheels may be cambered at an angle of about 0° to about 10° per wheel from a truly vertical position, and preferably, from an angle of 3° to about 5° per wheel in order to achieve the most desirable results.

Along with the cambering of the rear wheels, these wheels can also be toed inwardly or outwardly by using shims (not shown) on the mounting brackets 146. Typically, it is desirable to toe the rear wheels outwardly when the rear wheels are cambered. Preferably, the rear wheels should be towed out at a ratio of one-third of the camber. Thus, for example, for every degree of camber, there should be a toe-out of about one-third degree.

Figure 8:
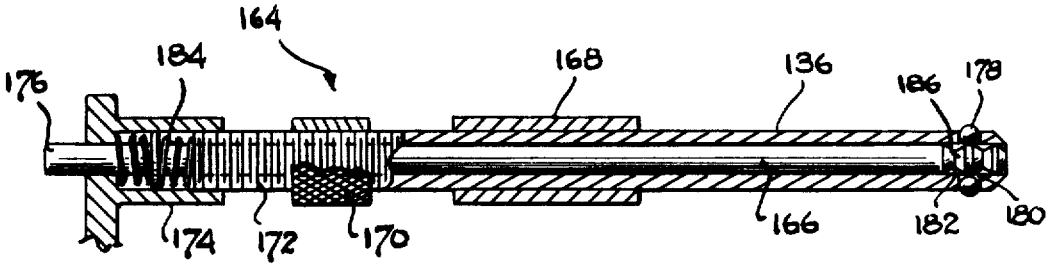
FIG. 8 is a vertical sectional view of one form of quick release means.
Figure 9:
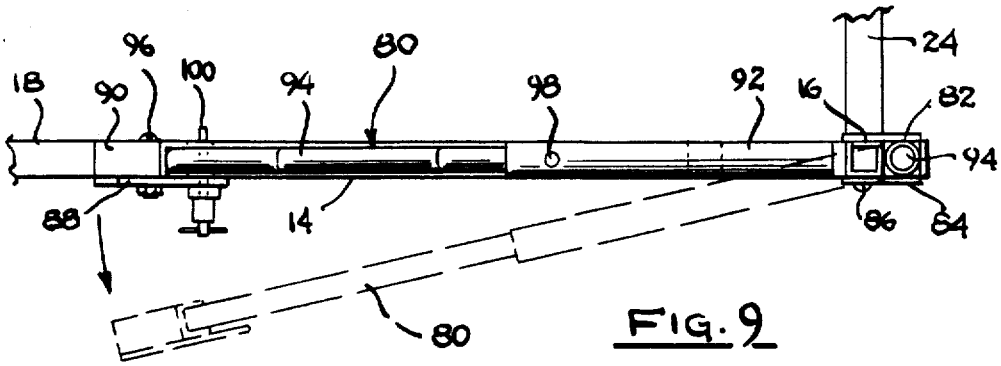
FIG. 9 is a side elevational view, partially broken away, and showing the shifting of an arm assembly forming part of the wheelchair of the present invention.
Figure 10:
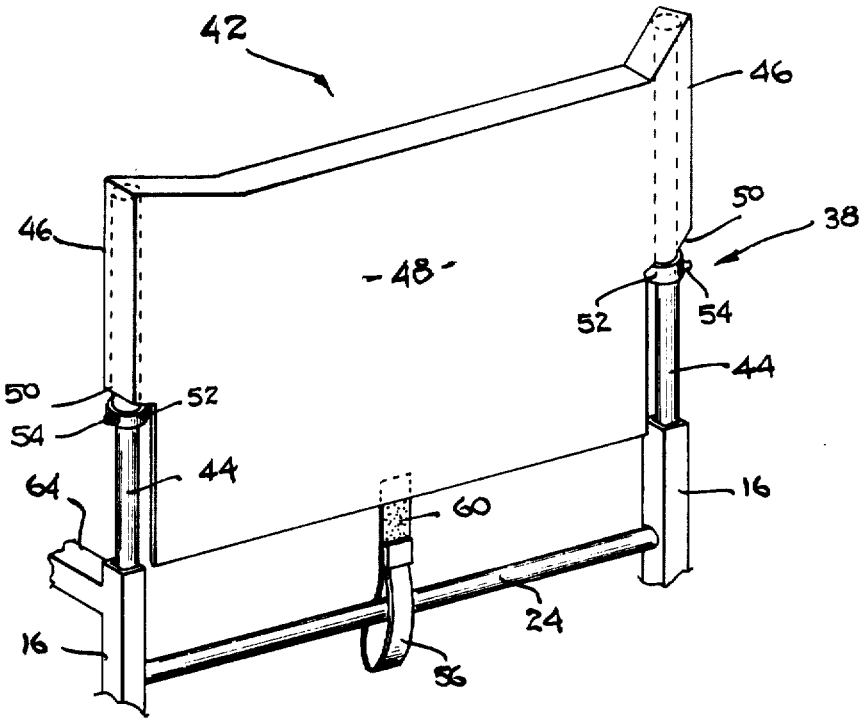
FIG. 10 is a perspective view of a portion of a seat structure forming part of the wheelchair of the present invention.
Figure 11:
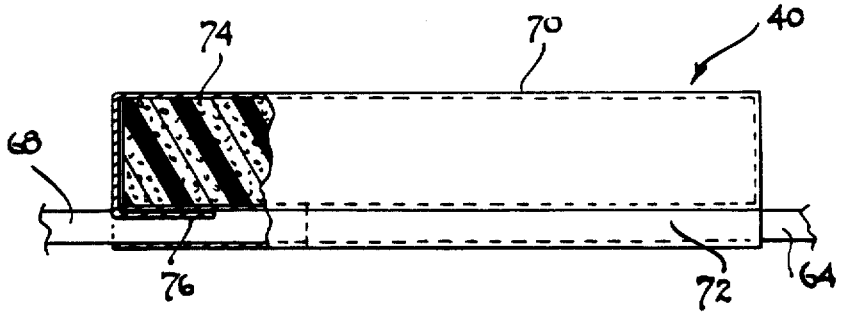
FIG. 11 is a side elevational view, partially broken away and in section, and showing a portion of the seat pad forming part of the seat structure of the invention.

The rear wheel axles 136 actually form part of a quick release lock mechanism 164 which is more fully illustrated in FIGS. 7 and 8 of the drawings. In this case, the quick release lock mechanism includes a pin 166 which is concentrically located within a bore in the axle 136 such that the axle 136 is effectively an outer sleeve for the release pin 166. In addition, a washer or outer sleeve 168 is disposed upon the axle 136 for limiting the axial movement thereof when in position to hold a rear wheel thereon. Further, a locking sleeve 170 having a knurled outer surface is also threadedly disposed on the threaded left hand end 172 of the axle 136. Thus, by positioning the locking sleeve 170, it is possible to provide for the proper location of the abuttment sleeve 168. At its left hand end, the axle 136 is provided with a handle 174, and which receives an outwardly extending end 176 of the release pin 166. This outwardly extending end 176 functions as a release button which is manually actuable to axially displace the pin 166 to thereby release a pair of detent balls 178 at the right-hand end of the axle 136. Further, the release pin 166 is provided with a plurality of grooves 182 such that when pushed inwardly, the grooves 182 become aligned with the balls 178 permitting them to fall inwardly. However, when the release pin 166 is biased to the left by means of a compression spring 184, the balls are displaced by a shoulder 186 thereby biasing the balls 178 outwardly. In this way, the balls function as locking elements.

Thus, when it is desired to mount a rear wheel in any of the rear wheel locations, the pin 166 can be pushed inwardly in through the axle 136 thereby permitting the locking elements 178 to fall radially inwardly toward the center of the axle. This will permit the axle to be removed from any of the aligned apertures 158 and 160. Moreover, the axle can then be removed from the hub 134 of the rear wheels. In like manner, when it is desired to mount the rear wheel on the wheelchair, the release pin 166 is pushed inwardly by manually engaging the outer end 176. Again, the locking elements 178 will be permitted to fall radially inwardly permitting the hub 134 to be mounted on the axle 136 and also permitting the axle to be inserted through the aligned apertures 158 and 160. Thus, when the outer end 176 is released and the release pin 166 is biased to the right, by means of the compression spring 184, the locking elements 178 will be biased outwardly thereby retentively locking the rear wheel on to the wheelchair.

It can be observed by means of the above construction, that it is possible to selectively position the rear wheels on the wheelchair frame. By positioning the rear wheels so that they are located in the lower and rearwardmost corner of the brckets 146, the wheelchair will assume a more standard riding position in the same manner as conventional wheelchairs. Thus, the wheelchair will function for normal day to day activity. By positioning the axle in the upper and forwardmost apertures 158 and 160 of the bracket 146, the rear portion of the wheelchair will be effectively shifted upwardly thereby raising the center of gravity. However, this is desirable in some situations. Thus, the center of gravity of the wheelchair can be easily altered. In addition, by shifting the rear wheel axles either rearwardly or forwardly in any of the selected axle receiving locations, it is also possible to effectively change the overall wheelbase of the wheelchair in order to obtain the desired riding characteristics.

Thus, there has been illustrated and described a unique and novel wheelchair which can be constructed in several different sizes from standard sized component sets and on which is capable of functioning for conventional movement as well as for athletic activities, and which therefore fulfills all of the objects and advantages sought therefor. It should be understood that many changes, modifications, variations, and other uses and applications will become apparent to those skilled in the after after considering this specification and the accompanying drawings. Therefore, any and all such changes, modifications, variations, and other uses and applications which do not depart from the spirit and scope of the invention are deemed to be covered by the invention which is limited only by the following claims.

Having thus described my invention, what I desire to claim and secure by Letters Patent is:

1. An apparatus for selectively positioning the rear wheels of a wheelchair having a frame means to selectively alter the center of gravity thereof, said apparatus comprising:

(a) a first pair of connected and spaced apart plates provided for attachment to one side of said frame means and a second pair of connected and spaced apart plates provided for attachment to an opposite side of said frame means, (b) a plurality of axle receiving openings on each of said pairs of spaced apart plates and the openings in the plates of each pair being aligned so as to be capable of receiving a rear wheel axle in each of said axle receiving, openings, (c) a separate rear wheel axle capable of extending outwardly from the rear wheel axle openings on each of said pairs of plates, (d) flange means on at least one of the plates of each of said pairs for fastener attachment to a frame means of said wheelchair such that the pairs of plates can be attached to the frame means in any of a plurality of selected locations to accommodate the size and intended use of a user, (e) quick release means associated with said rear wheel axle to enable quick release and replacement of rear wheels on said rear wheel axle, such that said axle can be easily removed from one location and replaced in another axle receiving location on said plates so that the response and center of gravity and wheel base on said frame can be easily and quickly altered.

2. The apparatus of claim 1 further characterized in that a matrix of at least four by four of said aligned spaced apart openings are on each of said spaced apart plates of each pair to receive said rear wheel axles.

3. The apparatus of claim 1 further characterized in that said flange means is provided with bolt holes and said pair of plates are attached to opposite sides of said frame means by bolts.

4. The apparatus of claim 3 further characterized in that said flange means includes a pair of flanges provided on each of said pairs and each of said flanges are provided with bolt holes for attachment to each of the opposite sides of said wheelchair by means of bolts.

5. The apparatus of claim 4 further characterized in that said quick release means is located on said rear wheel axle.

6. The apparatus of claim 5 further characterized in that said quick release means comprises at least one retaining pin extending outwardly from said axle and capable of being retracted therein to permit removal of a wheel on said axle, and manually actuable means on said axle for causing said retaining pin to be retracted upon actuation of said manually actuable means.

7. An apparatus for selectively positioning the front wheels of a wheelchair having a frame means to selectively alter the angle of attack of the wheelchair relative to a ground plane, said apparatus comprising:

(a) a pair of wheel post housings on said frame means, (b) a post extending outwardly from each of said wheel post housing and being rotatable relative to said wheel post housings, (c) a separate bracket carried by each of said posts and being rotatable about a generally vertical axis relative to the associated wheel post housing, and each of said brackets having a pair of spaced apart plates with a plurality of pairs of aligned apertures in said spaced apart plates, (d) a separate wheel assembly for each said bracket and each wheel assembly being comprised of a wheel and an axle capable of being disposed in any of the plurality of pairs of aligned apertures to thereby adjust the plane of the frame and hence the angle of attack of the wheelchair relative to a ground plane, and (e) a mounting member extending from each of the wheel posts housings and being adapted for attachment to said frame means in a first position and a second position, the wheel post housings being located outwardly of the sides of the frame means when the associated mounting members are in the first position and being located inwardly of the sides of the frame means when the associated mounting members are in the second position, the positions of said front wheels in either the first or second position being a function of steering radius and steering stability.

8. The apparatus of claim 7 further characterized in that said brackets are sized so that different sized wheels can be removably mounted with respect to each of said brackets.

9. The apparatus of claim 7 further characterized in that said wheel post housings are generally vertically located, and said posts extend downwardly and outwardly from the associated wheel post housing.

10. The apparatus of claim 9 further characterized in that said pair of aligned apertures are vertically located in said spaced apart plates.

11. The apparatus of claim 8 further characterized in that said apparatus is adapted to selectively position rear wheels on the frame means of a wheelchair, said apparatus further comprising:

(1) a pair of spaced apart plates on said frame means, (2) a plurality of axle receiving locations on each of said spaced apart plates and which are capable of receiving a rear wheel axle in each of said axle receiving locations, (3) a rear wheel axle capable of extending between the rear wheel axle location on each of said plates for carrying a rear wheel, and (4) quick release means on said rear wheel axle to enable quick release and replacement of rear wheels on said rear wheel axle.

12. The apparatus of claim 7 further characterized in that said mounting means comprises a somewhat inverted U-shaped member capable of fitting over a bar of the frame means and being attached thereto by means of a fastner.

13. A wheelchair capable of being used for sports activities and also for normal transport, said wheelchair comprising:

(a) a frame means, (b) a seat mounted on said frame means for supporting an individual using such wheelchair, (c) a foot rest member of said frame means and extending forwardly therefrom, (d) a pair of rear wheels mounted on said frame means capable of being engaged by a user for propelling said wheelchair, (e) a pair of front wheels mounted on said frame means for normally being in engagement with the ground or other supporting surface and having a diametral size substantially less than said rear wheels, said rear wheels and front wheels normally being in engagement with the ground or other supporting surface when said wheelchair is propelled forwardly or in turns in normal transport, and (f) a pair of rollers on said foot rest member and normally being spaced above the ground or other supporting surface a relatively slight distance above the lower ends of said front wheels when said wheelchair is used for normal transport, said wheelchair capable of being tipped by the user thereof so that said rear wheels are temporarily raised a relatively slight distance from the ground or other supporting surface and said rollers are lowered into temporary engagement with the ground or other supporting surface.

14. The wheelchair of claim 13 further characterized in that said seat is located in a normal sitting location for supporting the user when said rear wheels and front wheels are in contact with the ground or other supporting surface.

15. The wheelchair of claim 13 further characterized in that said rollers have a diametral size substantially less than said front wheels.

16. The wheelchair of claim 15 further characterized in that said rear wheels are mounted so that they are adapted for rotation in the same direction such that they are not capable of rotation about a vertical axis, but that such rollers and front wheels are capable of being rotated about a vertical axis.

17. The wheelchair of claim 15 further characterized in that hand rims are mounted on said rear wheels for engagement by a user to propel the wheelchair.

18. A wheelchair capable of being used for sport activities and, also for normal transport, said wheelchair comprising:

(a) a frame means, (b) a seat mounted on said frame means for supporting an individual using such wheelchair, (c) a foot rest member on said frame means and extending forwardly therefrom, (d) a first pair of spaced apart and connected plates on one side of said frame means and a second pair of spaced apart and connected plates on the opposite side of said frame means, (e) a plurality of axle receiving openings on each of said spaced apart plates and the openings in the plates of each pair being aligned so as to be capable of receiving a rear wheel axle in each of said axle receiving openings, (f) a rear wheel axle capable of extending between the rear wheel axle openings on each of said pairs of plates, (g) flange means on at least one of the plates of each of said pairs and being attached by fasteners to said frame means, (h) quick release means associated with said rear wheel axles to enable quick release and replacement of rear wheels on said rear wheel axles, such that the axles can be easily removed from one pair of openings and replaced in another axle receiving pair of openings on said plates so that the response and center of gravity and wheel base of said frame can be easily and quickly altered, (i) a rear wheel provided for disposition on each of said rear axles for normally being in engagement with the ground or other supporting surface and capable of being operatively engaged by a user for propelling said wheelchair, (j) a pair of wheel post housings on said frame means, (k) a post extending outwardly from each of said wheel post housings, (l) a separate bracket carried by each of said posts and being rotatable about a generally vertical axis relative to the associated wheel post housings, each of said brackets having a pair of spaced apart plates with a plurality of pairs of aligned apertures in said spaced apart plates, (m) a separate front wheel assembly for each said bracket and each wheel assembly being comprised of a front wheel and front wheel axle capable of being disposed in any of the plurality of pairs of aligned apertures to thereby adjust the plane of the frame, and hence, the angel of attack of the wheelchair relative to a ground plane, said front wheels being normally in engagement with the ground or other supporting surface and having a diametral size substantially less than said rear wheels, said rear wheels and front wheels normally being in engagement with the ground or other supporting surface when said wheelchair is propelled forwardly or turns in normal transport, and (n) a pair of rollers on said foot rest member and normally being spaced above the ground or other supporting surface a relatively slight distance above the lower ends of said front wheels when said wheelchair is used for normal transport, said wheelchair capable of being tipped by the user thereof so that said rear wheels are temporatily raised a relatively slight distance from the ground or other supporting surface and said rollers are lowered into engagement with the ground or other supporting surface.

19. The wheelchair of claim 18 further characterized in that said seat is located in a normal sitting location for supporting the user when said rear wheels and front wheels are in contact with the ground or other supporting surface.

20. The wheelchair of claim 18 further characterized in that said rollers have a diametral size substantially less than said front wheels.

21. The wheelchair of claim 18 further characterized in that said rear wheels are mounted so that they are adapted for rotation in the same direction such that they are not capable of rotation about a vertical axis, but that such rollers and front wheels are capable of being rotated about a vertical axis.

22. The wheelchair of claim 18 further characterized in that a matrix of at least four by four of said aligned spaced apart openings are on each of said spaced apart plates of each pair to receive said rear wheel axles.

23. The wheelchair of claim 18 further characterized in that said quick release means is located on said rear wheel axles and each comprising at least one retaining pin extending outwardly from said axle and capable of being retracted therein to permit removal of a wheel on said axle, and manually actuable means on each said shaft for causing said retaining pin to be retracted upon actuation of said manually actuable means.

24. The wheelchair of claim 18 further characterized in that said brackets are sized so that different sized front wheels can be removably mounted with respect to each of said brackets.

25. A wheelchair comprising:

(a) a main frame being comprised of:

(1) a plurality of longitudinally extending rigid members, (2) a plurality of transversely extending rigid members rigidly secured to said longitudinally extending members, (3) a plurality of first generally upright members on a rear portion of said frame, (4) a plurality of second generally upright members on a front portion of said frame, (b) a seat structure capable of being attached to and adjustably positioned on said frame, said seat structure being comprised of:

(1) a seat frame having a plurality of first posts, each capable of being telescopically fitted with respect to a separate one of said first generally upright members and adjustably located with respect thereto, a plurality of second posts with each being telescopically fitted with respect to a second one of said second generally upright members and adjustably located with respect thereto, (2) a seat pad carried by said seat frame, (3) arm support means on each of the opposite sides of the wheelchair for attachment to said first and second generally upright members, and (c) a foot support structure capable of being attached to and adjustably positioned at the front portion of said frame, said foot support structure comprised of:

(1) a plurality of second posts, each capable of being fitted with respect to a separate one of said second generally upright members and adjustably located thereon, (2) a foot receiving member connected to said second posts whereby several different sized wheelchairs can be constructed with commonly sized main frames and commonly sized foot support structures and commonly sized seat structures.

26. The wheelchair of claim 25 further characterized in that said seat frame has additional parts capable of being fitted with respect to upper ends of said first upright tubular members.

27. The wheelchair of claim 26 further charcterized in that said upright members are tubular and said posts are capable of being fitted into said upright members.

28. The wheelchair of claim 25 further characterized in that arm rests are capable of being adjustably attached to said main frame.

29. The wheelchair of claim 25 further characterized in that rear wheels are capable of being mounted with respect to said main frame in a plurality of positions.

30. The wheelchair of claim 29 further characterized in that front wheels are capable of being mounted with respect to said main frame in a plurality of positions.

31. A wheelchair capable of being used for athletic activities and also for normal transport, said wheelchair comprising:

(a) a frame means, (b) a seat mounted on said frame means for supporting an individual using such wheelchair, (c) a first pair of connected and spaced apart rear axle mounting plates on one side of said frame means and a second pair of connected and spaced apart rear axle mounting plates on an opposite side of said frame means, (d) flange means on at least one of the plates of each pair for securement to said frame means, (e) a plurality of axle receiving openings on each of said spaced apart rear axle mounting plates, the openings in the plates of each pair being aligned so as to be capable of receiving a rear wheel axle in said axle receiving openings on opposite sides of said wheelchair, at least certain of said rear axle openings being located in a generally horizontal plane so as to primarily alter the wheel base of the wheelchair when a rear wheel axes is shifted between the rear axle receiving openings, (f) a pair of rear wheel axles capable of being located in said rear wheel axle openings, (g) a rear wheel provided for disposition on each said rear wheel axles for normally being in engagement with the ground or other supporting surface, (h) a pair of front wheel mounting means, (i) a plurality of front wheel axle receiving positions with respect to each said front wheel mounting means to enable front wheel axles to be mounted at any of said front wheel axle receiving positions, (j) front wheel axles capable of being located in said front wheel axle receiving a position, (k) a front wheel capable of being located with respect to each said front wheel axle, (l) a separate front wheel post housing on each of the opposite sides of the wheelchair frame means, (m) a front wheel post extending outwardly of each of said post housings and being rotatable relative to said housings, said posts being secured to said front wheel post housings at the respective sides of the wheelchair, and (n) a pair of mounting members forming part of said front wheel mounting means and each extending from one of the wheel post housings and being adapted for attachment to said frame means in a first position and a second position, the wheel post housings being located outwardly of the sides of the frame means when the associated mounting members are in the first position and being located inwardly of the sides of the frame means when the associated mounting members are in the second position, the positions of said front wheels in either the first or second position being a function of steering radius and steering stability.

32. The wheelchair of claim 31 further characterized in that quick release means is associated with said rear wheel axles to enable quick release and replacement of rear wheels on said rear wheel axles, such that the rear wheel axles can be easily removed from one set of openings and replaced in another set of axle receiving openings so that the response and center of gravity and wheel base on said frame can be easily and quickly altered.

33. The wheelchair of claim 32 further characterized in that said rear wheels and front wheels are normally in engagement with the ground or other supporting surface when said wheelchair is propelled forwardly or in turns in normal transport, and a foot rest member is on said frame means and extends forwardly therefrom, a pair of rollers are provided on said foot rest member and are normally spaced above the ground or other support surface a relatively slight distance above the lower ends of said front wheels when said wheelchair is used for normal transport, said wheelchair capable of being tipped by the user thereof so that said rear wheels are temporarily raised a relatively slight distance from the ground or other supporting surface and said rollers are temporarily lowered into engagement with the ground or other supporting surface.

34. A wheelchair capable of being used for sports activities and also for normal transport, said wheelchair comprising:

(a) a frame means, (b) a seat mounted on said frame means for supporting an individual using such wheelchair, (c) a first pair of connected and spaced apart plates attached to said frame means in a canted position so that wheels operatively mounted thereon would be canted, (d) a second pair of connected and spaced apart plates attached to said frame means in a canted position so that wheels operatively carried thereby would be canted, (e) a plurality of axle receiving openings on each of said pairs of spaced apart plates and capable of receiving a rear wheel axle in each of said axle receiving openings, (f) a rear wheel axle capable of extending outwardly from the rear wheel axle openings on each of said pairs of plates, (g) quick release means associated with said rear wheel axles to enable quick release and replacement of rear wheels on said rear wheel axle, such that said axles can be easily removed from one pair of openings and replaced in another axle receiving pair of openings on said plates so that the response and center of gravity and wheel base on said frame can be easily and quickly altered, (h) flange means on at least one of the plates of each of said pairs for attachment to said frame means of said wheelchair, (i) a rear wheels mounted on each said rear wheel axles and capable of being operatively engaged by a user for propelling said wheelchair, said rear wheel axles and the wheels mounted thereon being canted so that the lower portions of the wheels re disposed outwardly with respect to the frame means and the upper portions are disposed near said frame, and (j) a pair of front wheels mounted on said frame means for normally being in engagement with the ground or other supporting surface and having a diametral size substantially less than said rear wheels, said front wheels capable of being mounted in a first position outwardly of said frame means and a second position inwardly of said frame means, the positions of said front wheels in either the first or second position being a function of steering radius and steering stability.

35. The wheelchair of claim 35 further characterized in that said rear wheel axles are mounted on said plates such that they are inclined downwardly and inwardly toward said frame means.

36. The wheelchair of claim 35 further characterized in that (a) a foot rest member is on said frame means and extends forwardly therefrom, and (b) a pair of rollers are on said foot rest member and normally are relatively slightly spaced above the ground or other supporting surface when said wheelchair is used for normal transport and capable of engaging the ground or other supporting surface when said wheelchair is tipped forwardly and where the rear wheels are then relatively slightly raised above the ground or other supporting surface.

37. A method of constructing a wheelchair having a main frame and a seat structure and a foot support structure, said method comprising:

(a) inserting rear posts of a seat structure into the upper ends of a plurality of first generally upright members on a rear portion of said frame, (b) inserting front posts of said seat structure into upper ends of second generally upright members on a front portion of said frame and where said front posts are operatively connected to said rear posts, (c) positioning said rear and front posts so that a seat on said seat structure is at a desired location and securing said rear posts, (d) inserting posts of a foot support structure into the lower ends of said second generally upright members on a front portion of said frame, (e) positioning said posts of said foot support structure so that a foot support member thereof is at a desired location and securing said last named posts whereby several different sized wheelchairs can be constructed with commonly sized main frames and foot support structures and seat structures, (f) inserting rear wheel axles in a desired one of a plurality of rear axle receiving locations on each of the opposite sides of the frame, (g) mounting a rear wheel on each of the rear wheel axles, and (h) mounting front wheels on each of the opposite sides of the frame at a desired one of a plurality of positions on the frame between the front and rear portions thereof.

38. The method of claim 37 further characterized in that said method comprises insertion of a seat pad forming part of said seat structure into a seat cover therefor and releasably sealing an opening on said seat cover.

39. The method of claim 38 further characterized in that said generally upright members and the posts capable of being fitted therein are adjustably telescopically arranged.

40. The method of claim 38 further characterized in that said method comprises adjustably attaching arm rests to main frame.

41. The method of claim 38 further characterized in that said method comprises mounting rear wheels with respect to said main frame in one of a plurality of vertically spaced apart positions and one of a plurality of horizontally spaced apart positions.

42. The method of claim 41 further characterized in that said method comprises mounting front wheels with respect to said main frame in one of a plurality of positions between front and rear portions of the frame and either inwardly or outwardly of said frame.

43. A mechanism for removably mounting the rear wheels of a wheelchair to a frame means of the wheelchair, said mechanism comprising:

(a) a pair of spaced apart and connected plates provided for securement to said frame means, each of said plates being provided with a plurality of spaced apart axle receiving openings in said plate and which are capable of receiving a rear wheel axle in each of said axle receiving openings, (b) a rear wheel axle capable of being inserted into and through any of said openings and extending outwardly from said plates, (c) a pin extending outwardly from said axle retentively holding said rear wheel axle in a selected opening and thereby holding a wheel on said axle, (d) manually actuable quick release means associated with said rear wheel axle to enable shiftable movement of said pin and thereby enable quick removal and replacement of a rear wheel on said rear wheel axle, and to also permit said axle to be easily removed from an opening and replaced in the same or another opening on said plate, and (e) a pair of flanges with each on an opposite side of one of the plates and having means to enable attachment to a frame means of the wheelchair.

44. The apparatus of claim 43 further characterized in that two pairs of said plates are provided with each having axle receiving openings to receive said rear wheel axles such that each one of the pairs is to be located on opposite sides of the frame means.

45. The apparatus of claim 44 further characterized in that a pair of rear wheel axles are provided so that an individual axle extends between the rear wheel openings on each of the opposite sides of said wheelchair.

46. The apparatus of claim 43 further characterized in that said quick release means is connected to said pin to cause retraction of said pin when actuated.

47. A wheelchair comprising:

(a) a main frame, (b) a first pair of connected and spaced apart plates attached to one side of said frame and a second pair of connected and spaced apart plates attached to an opposite side of said frame, (c) a plurality of axle receiving openings on each of said spaced apart plates and openings in each of the plates of a pair being aligned to be capable of receiving a rear wheel axle in each of said axle receiving openings, (d) a rear wheel axle extending outwardly from the rear wheel axle openings on each of said pairs of plates, (e) flange means on at least one of the plates of each of said pairs for fastner attachment to a frame means of said wheelchair, (f) quick release means on said rear wheel axle to enable quick release and replacement of rear wheels on said rear wheel axle, such that said axles can be easily removed from one location and replaced in another axle receiving location on said plates so that the response and center of gravity and wheel base on said frame can be easily and quickly altered, said quick release means comprising:

(1) at least one retaining pin extending outwardly from said axle and capable of being retracted therein to permit removal of a wheel on said axle, (2) manually actuable means on said axle for causing said retaining pin to be retracted upon actuation of said manually actuable means, (g) a pair of wheel post housings on said frame means, (h) a post extending vertically downwardly from each of said wheel post housings and being rotatable with respect to the associated post housing, (i) a separate bracket carried by each of said posts and being rotatable about a generally vertical axis relative to the associated wheel post housing, and each of said brackets having a pair of spaced apart plates with a plurality of pairs of vertically spaced apart aligned apertures in said spaced apart plates, (j) a separate wheel assembly for each said bracket and each wheel assembly being comprised of a wheel and an axle capable of being disposed in any of the plurality of pairs of aligned apertures to thereby adjust the plane of the frame and hence the angle of attack of the wheelchair relative to a ground plane, (k) a mounting member extending from each of the wheel post housings and being adapted for attachment to said frame means in a first position and a second position, the wheel post housings being located outwardly of the sides of the frame means when the associated mounting members are in the first position and being located inwardly of the sides of the frame means when the associated mounting members are in the second position, the first or second positions being a function of steering radius and steering stability, said rear wheels and front wheels normally being in engagement with the ground or other supporting surface when said wheelchair is propelled forwardly or in turns in normal transport, (l) a seat mounted on said frame for supporting an individual using such wheelchair, (m) a foot rest member of said frame and extending forwardly therefrom, and (n) a pair of rollers on said foot rest member and normally being spaced above the ground or other supporting surface a relatively sight distance above the lower ends of said front wheels when said wheelchair is used for normal transport, said wheelchair capable of being tipped by the user thereof so that said rear wheels are temporarily raised a relatively slight distance from the ground or other supporting surface and said rollers are lowered into engagement with the ground or other supporting surface.

*48. An apparatus for selectively positioning the main driving wheels of a wheelchair having a frame to selectively alter the center of gravity thereof, said apparatus comprising:*

*(a) a bracket having means having a plurality of spaced apart axle holes extending therethrough and provided for attachment to one side of said frame and which holes are sized so as to be capable of receiving a rear wheel axle,*

*(b) a second bracket having means having a plurality of axle receiving holes extending therethrough and provided for attachment to an opposite side of said frame and which holes are sized so as to be capable of receiving a wheel axle,*

*(c) a separate wheel axle capable of extending outwardly from any one of the wheel axle holes in each of said brackets,*

*(d) means for attachment of said brackets to a frame means of said wheelchair, and*

(e) a separate quick release means associated with each of said wheel axles to enable quick release and replacement of the driving wheels on said wheel axles, each of said quick release means comprising a manually actuatable element which operates to permit release of the axle from the hole when actuated and which permits re-*insertion into the same or another hole by pushing the axle into said same or another hole where it becomes locked therein, such that each of said axles can be easily removed from a hole in a bracket and replaced in another axle receiving hole in said bracket so that the response and center of gravity and wheel base on said frame can be easily and quickly altered.*

*49. The apparatus of claim 48 further characterized in that one of said holes is horizontally spaced from another of said holes with each sized to receive said wheel axles.*

*50. The apparatus of claim 48 further characterized in that another one of said holes is vertically spaced from said first named hole and sized to receive a wheel axle.*

*51. The apparatus of claim 48 further characterized in that said manually actuatable elements are pushable pins which operates to permit release and permit removal of said axles when pushed.*

*52. The apparatus of claim 51 further characterized in that each of said quick release means comprises at least one retaining element extending outwardly from said axle and capable of being retracted therein to permit removal of a wheel on said axle, and said manually actuatable element of each said quick release means causes said retaining element to be retracted upon actuation of said manually actuatable element.*

*53. The apparatus of claim 48 further characterized in that said releasable axles are rear wheel axles and said quick release means are located on said rear wheel axles.*

*54. A wheelchair in which the center of gravity thereof, can be selectively altered, said wheelchair comprising:*

*(a) a main frame,*

*(b) a separate bracket attached to each of the opposite sides of said frame, each of said brackets having a plurality of axle receiving openings which are sized to receive a driving wheel axle,*

*(c) a driving axle capable of extending outwardly from any one of the axle receiving openings in each of said brackets,*

*(d) a separate driving wheel carried by each said driving wheel axle, and*

*(e) a quick release means associated with said driving wheel axles to enable quick release and replacement of said driving wheels on said driving wheel axles, such that each of said axles can be easily removed from one opening and replaced in another axle receiving opening in a bracket so that the response and center of gravity and wheel base on said frame can be easily and quickly altered, said quick release means comprising a manually actuatable element which operates to permit release of the axle from the opening when actuated and which permits re-insertion into the same or another opening by pushing the axle into said same or another opening where it becomes locked therein, whereby manual pushing of said manually actuatable element and pulling on the driving wheel axle is sufficient to cause release and ultimate removal of an axle and pushing of the axle into another opening enables re-insertion and locking of the axle in that opening.*

*55. The wheelchair of claim 54 further characterized in that means is provided on each of the brackets for attachment to a frame of said wheelchair such that the brackets can be attached to the frame in a desired location.*

*56. The wheelchair of claim 55 further characterized in that each of said brackets can be attached to the frame of the wheelchair so as to achieve a desired camber of the driving wheels.*

*57. The wheelchair of claim 55 further characterized in that said means for attachment is a flange means which is provided with bolt holes and said brackets are attached to said frame by bolts.*

*58. The wheelchair of claim 54 further characterized in that a matrix of at least four by four of said aligned spaced apart openings are on each of said brackets to receive said axles.*

*59. The wheelchair of claim 54 further characterized in that said manually actuatable element comprises a pushable pin extending axially through each of said axles, and locking means extending outwardly of said axle to hold same at an opening in a bracket and actuatable by said pin when pushed to cause said locking means to be retracted, such that only manual pushing of said pin and pulling on said axle is sufficient to enable release and ultimate removal or re-insertion of an axle.*

*60. The wheelchair of claim 59 further characterized in that said locking means comprises at least one retaining sphere extending outwardly from an aperture in said axle and capable of being retracted therein to permit removal of the axle from an opening and removal of a wheel on said axle when said manually actuatable pin is pushed inwardly.*

*61. The wheelchair of claim 54 further characterized in that means is provided to adjust the position of the axle and the amount of extension of the axle through the bracket.*

*62. The wheelchair of claim 61 further characterized in that the means to adjust comprises a threaded sleeve for threaded adjustment.*

*63. The wheelchair of claim 54 further characterized in that said releasable axles are rear wheel axles and said quick release means are located on said rear wheel axles.*

*64. An apparatus for selectively positioning the main driving wheels of a wheelchair having a frame to selectively alter the center of gravity thereof, said apparatus comprising:*

*(a) a bracket having opening means thereon and extending therethrough and provided for attachment to one side of said frame and which opening means is sized to be capable of receiving a rear wheel axle in any of a plurality of selected locations,*

*(b) a second bracket having opening means therein and extending therethrough and provided for attachment to an opposite side of said frame and which opening means is also sized so as to be capable of receiving a wheel axle in any of a plurality of selected locations,*

*(c) a separate wheel axle capable of extending outwardly from each one of said opening means in each of said brackets,*

*(d) means for attachment of said brackets to a frame of said wheelchair, and*

*(e) a separate quick release means associated with each of said wheel axles to enable quick release and replacement of the driving wheels on said wheel axles, each of said quick release means comprising a manually actuatable element which operates to permit release of the axle from the opening means when actuated and which permits re-insertion into the opening means in the same location or another location by pushing the axle into said opening means where it becomes locked therein, such that each of said axles can be easily removed from the opening means in a bracket and replaced in the opening means in the same or another location in said bracket so that the response and center of gravity and wheel base on said frame can be easily and quickly altered.*

*65. The apparatus of claim 64 further characterized in that the opening means permits movement of an axle longitudinally with respect to the frame of a wheelchair.*

*66. The apparatus of claim 64 further characterized in that the opening means permits movement of an axle both vertically and longitudinally with respect to the frame of a wheelchair.*

* * * * *